United States Patent [19]

van der Lely

[11] 4,218,896
[45] Aug. 26, 1980

[54] OVERLOAD COUPLINGS

[76] Inventor: Cornelis van der Lely, 7, Brüschenrain, Zug, Switzerland

[21] Appl. No.: 873,933

[22] Filed: Jan. 31, 1978

[30] Foreign Application Priority Data

Feb. 1, 1977 [NL] Netherlands ................. 7701013

[51] Int. Cl.² .................. 192 56 R; F16D 9/00
[52] U.S. Cl. ........................... 64/28 R; 64/1 R
[58] Field of Search .............. 64/28 R, 17 R, 1 R; 192/56 R

[56] References Cited

U.S. PATENT DOCUMENTS

| | | | |
|---|---|---|---|
| 373,784 | 11/1887 | Myers | 64/28 R |
| 2,332,859 | 10/1943 | Kreissig et al. | 64/28 R |
| 2,420,573 | 5/1947 | Stewart, Sr. | 64/28 R |
| 2,748,578 | 6/1956 | Potts | 64/28 R |
| 2,838,920 | 6/1958 | Hill, Jr. et al. | 64/28 R |
| 3,049,898 | 8/1962 | Voth | 64/28 R |
| 3,525,225 | 8/1970 | Yager et al. | 64/28 R |
| 3,589,487 | 6/1971 | Donnell | 192/56 R |
| 3,866,728 | 2/1975 | Dowin | 192/56 R |
| 3,982,408 | 9/1976 | Wright | 64/28 R |

FOREIGN PATENT DOCUMENTS

1140770 10/1961 Fed. Rep. of Germany .......... 64/28 R

*Primary Examiner*—Ira S. Lazarus
*Attorney, Agent, or Firm*—Mason, Mason and Albright

[57] ABSTRACT

An overload coupling includes an automatically positioned frangible portion to replace a just fractured frangible portion. A first coupling member caused to rotate by the power take-off of a tractor, or the like, has a rotary advancing spring connected thereto which can be hand wound to bias a removable magazine for the frangible element carried by a housing mounted on the first coupling member so as to be rotated by the advancing spring. A second coupling member is journalled on the first coupling member and drivingly connects to an agricultural implement or the like. It further connects through the frangible element to the first coupling member. The first coupling member defines a guide for the end of the frangible element, a portion of which is received in a slot or opening in the second coupling member. When the portion of the frangible element in such opening fractures due to an overload transmitted from the implement to the second coupling member, the advancing spring causes a further frangible portion to be introduced into the opening after, however, the first coupling member has its speed sufficiently reduced to permit such introduction. In one embodiment, the frangible element is a steel tape; in another it is a plurality of radially extending shear pins each adapted to be twice fractured. A cam on the interior of a ring advanced by the spring causes a non-fractured (or once fractured) shear pin to be moved into the opening therefor following each fracture of the preceding pin in the opening. The shear pins are disposed in single or double rows in an arc of about 160° in the first coupling member. In another embodiment, the shear pins extend parallel to the axis of rotation of the coupling members.

79 Claims, 9 Drawing Figures

FIG. 4

OVERLOAD COUPLINGS

According to a first aspect of the present invention there is provided an overload coupling comprising two coupling members and a frangible element which, in normal operation, interconnects the two coupling members for rotation together, rotary advancing means being provided for advancing, after fracture of the frangible element, the same or another frangible element into a position in which it re-connects the two coupling members.

In embodiments in accordance with this aspect of the invention, subsequent to every fracture of the frangible element, the remaining portion of the frangible element re-establishes a new connection between the two coupling members for many successive overloads, the advancing means being adapted to match the frequent ruptures of the breaking member.

According to a second aspect of the present invention there is provided an overload coupling comprising two coupling members and a frangible element which, in normal operation, interconnects the two coupling members for rotation together, rotary advancing means being provided for advancing the frangible element, after fracture of the frangible element, into a position in which it re-connects the two coupling members.

According to a third aspect of the present invention there in provided an overload coupling comprising two coupling members and a frangible element which, in normal operation, interconnects the coupling members, the frangible element being at least partly curved.

The present invention also provides frangible elements for use in overload couplings.

For a better understanding of the present invention and to show how it may be carried into effect, reference will now be made, by way of example only, to the accompanying drawings, in which.

Figure 1:
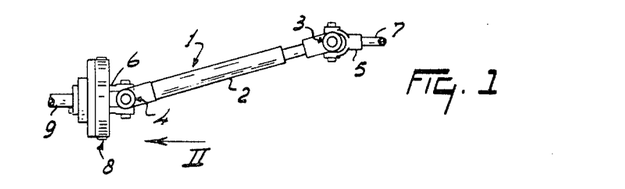
FIG. 1 is an elevational view of an intermediate shaft including an overload coupling.

FIG. 1 shows an intermediate shaft 1 comprising a main portion 2, which is connected at both ends by universal joints 3 and 4 with end portions 5 and 6. The end portion 5 has internal splines which co-operate with splines of a shaft portion 7; this shaft portion 7 is preferably constituted by the input shaft of an implement, or a part of an implement, to be driven. The end portion 6 includes an overload coupling 8, which is coupled with a power take-off shaft 9 of a prime mover, for example an agricultural tractor. The intermediate shaft 1 bridges the distance between the power take-off shaft 9 and the shaft portion 7 and in addition allows a comparatively large swinging movement between the implement and the tractor. The intermediate shaft 1 can, of course be connected the other way round to that shown in FIG. 1, the end portion 5 then being coupled with the power take-off shaft and the implement with the shaft portion 6.

Figure 2:
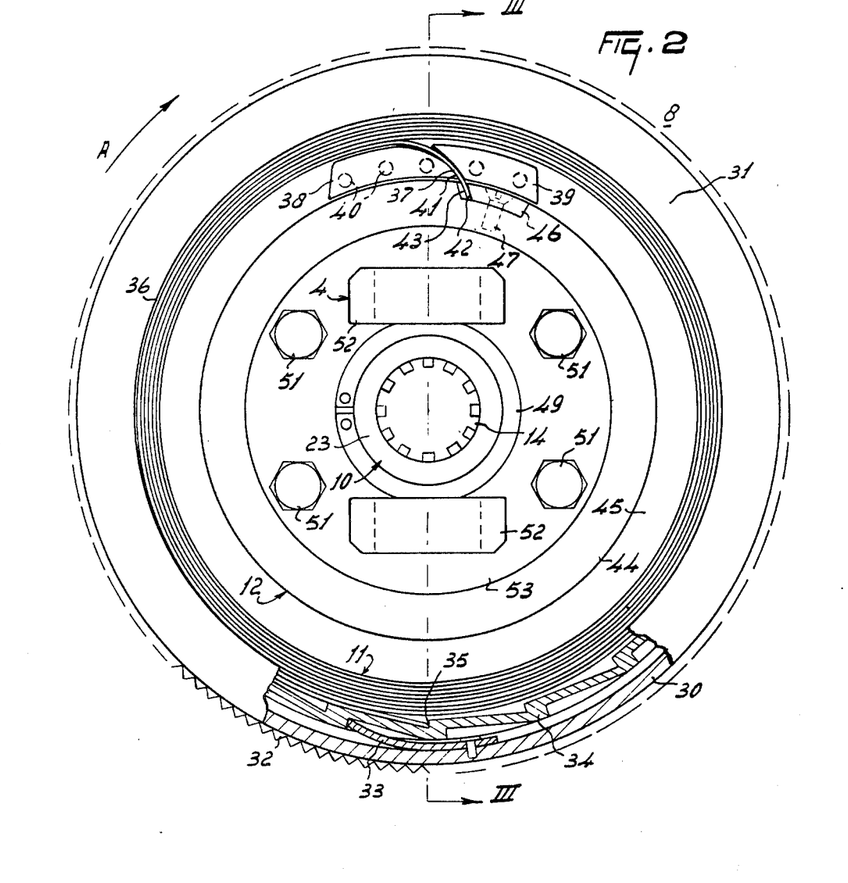
FIG. 2 is an elevational view of the overload coupling taken in the direction of the arrow II in FIG. 1.
Figure 3:
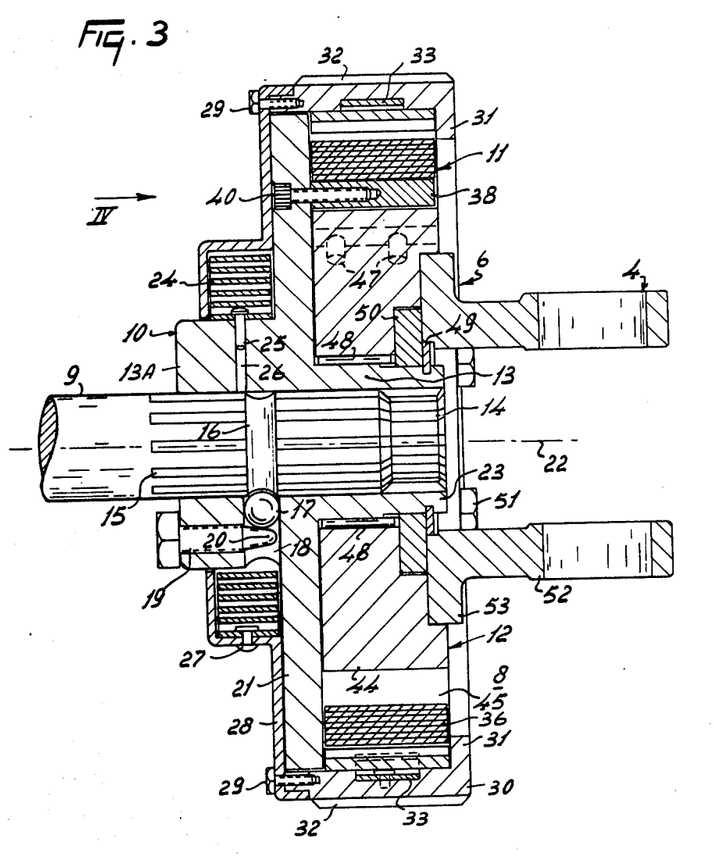
FIG. 3 is a sectional view of the overload coupling taken on the lines III—III in FIG. 2.
Figure 4:
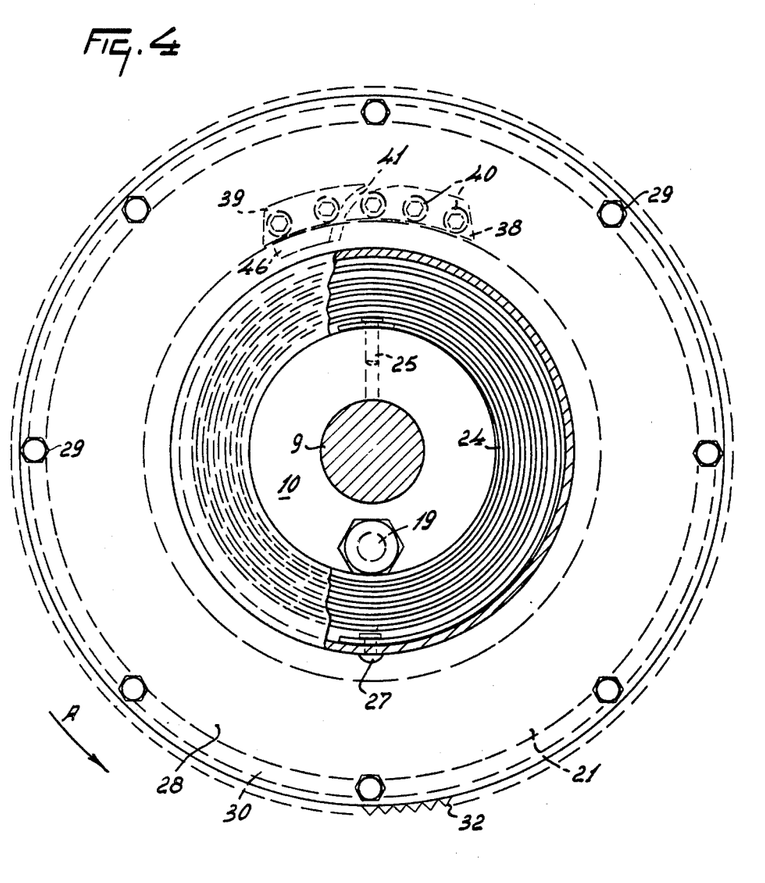
FIG. 4 is an elevational view taken in the direction of the arrow IV in FIG. 3.

The overload coupling 8 comprises a first coupling member 10, which is connected, in normal operation, by means of a frangible element 11 with a second coupling member 12 (FIGS. 2, 3). The first coupling member 10 comprises a hub 13 provided on its inner side with longitudinal splines 14, which co-operate with splines 15 of the power take-off shaft 9. The power take-off shaft 9 has an annular slot 16, which is engaged by retaining means comprising a ball 17 located in a radial bore 18 in a widened portion 13A of the hub 13. The ball 17 is locked in position in the bore 18 by a bolt 19 which extends parallel to the power take-off shaft 9. The bolt 19 comprises a round tapered portion 20, which projects into the bore 18 and presses the ball 17 into the slot 16. The bolt 19, the ball 17 and the slot 16 thus prevent axial displacement of the power take-off shaft 9 with respect to the overload coupling 8. Adjacent the bore 18 the hub 13 is connected with a coupling plate 21, which extends radially outwardly from the hub 13 with respect to the rotary axis 22 of the hub 13. The coupling plate 21 preferably has a circular outer periphery and a radius equal to about 5- to 6-times the radius of the power take-off shaft 9. The hub 13 comprises furthermore a narrowed portion 23 extending as far as the side of the hub 13 nearer the universal joint 4. The widened portion 13 A of the hub 13 is provided with drive means constituted by a spiral leaf spring 24, for example, five turns of which surround the portion 13A. The thickness/width ratio to the leaf spring 24 is at least 1:10. The inner part of the spring 24 is secured to the hub portion 13A by a rivet 25 (which could be replaced by a bolt) in a bore 26. The outermost end of the spring 24 is fastened by means of a rivet (or bolt) 27 to a cover plate 28. The cover plate 28 encloses the spring 24 on the side away from the plate 21 and at the outer circumference of the spring 24, and it also extends in a radial direction away from the spring, parallel to the plate 21. There is some clearance between the plate 28 and the portion 13A. Near the outer edge of the overload coupling the plate 28 is bent over at right angles and extends for a distance parallel to the rotary axis 22. Near the portion bent over at right angles the plate 28 is secured to an outer wall 30 by bolts 29 extending parallel to the rotary axis 22. The outer wall 30 is approximately coaxial with the rotary axis 22. From the plate 28 the wall 30 extends towards the universal joints 4 and, as viewed in a radial direction, it has a bent-over portion 31 about where hub 13 ends. The wall 30 and the plate 28 from the outer circumference of the overload coupling and have a substantially cylindrical shape. So that a good grip can be obtained on the outer periphery of the wall 30, it is provided with unevennesses formed by milling 32. On its inner side the wall 30 has at least one pawl spring 33 (FIG. 2); preferably there are more than three pawl springs 33. Referring to the sectional view of FIG. 2, the pawl springs extend in the direction of the arrow A and curve away from the wall 30 towards the rotary axis 22. The pawl spring 33 co-operates with the outer periphery of a ring 34. As viewed in a direction parallel to the rotary axis 22, the ring 34 has a sawtooth profile, the serrations on the outer side being intended to block the pawl springs 33 against movement in one direction. The ring 34 is otherwise not fixedly connected with the rest of the overload coupling. The spring 24, the wall 30 and the ring 34 constitute together advancing means for the frangible element 11. The internal part of the ring 34 also has a sawtooth profile and is in engagement with the free end 35 of the frangible element 11 which comprises a length of steel tape 36, preferably spring steel. The ring 34 and the steel tape each have an axial width corresponding to the distance between the bent-over portion 32 and the coupling plate 21. From the ring 34 the steel tape 36 has, for example, ten turns in the space bounded by the inner wall of the ring 34. The steel tape has a thickness of about 1 mm and a width of 4 to 7 cms, preferably about 6 cms. The nature of the steel tape means that it has elastic properties. The end portion 37 of the steel tape 36, remote from the ring 34, is deflected from the substantially tangential position of the rest of the tape, with respect to the rotary axis 22, into a more radial position. This is done by passing the end portion 37 through guide means comprising a first cutting block 38 and a second cutting block 39. The cutting blocks 38 and 39 are fixed by hollow screws to the coupling plate 21 and their surfaces facing the rotary axis 22 are arcuate approximately coaxial with the rotary axis 22. Between the cutting blocks 38 and 39 is defined a guide slot 41, the distance between the blocks 38 and 39, viewed in a tangential direction, and also the transverse distance across the slot, decreasing towards the rotary axis 22 until the blocks 38 and 39 intimately embrace the steel tape 36. The slot 41 guides the end portion 37 in such a way as to give this end portion 37, at least locally, a tighter curve than the rest of the steel tape 36. The length of the slot 41 is about 1 to 3 cms, preferably about 2 cms. The cutting blocks 38 and 39 are made from hardened material, for example, titanium carbide. The tip 42 of the end portion 37 fits in an opening 43 provided in a second coupling plate 44 (FIG. 2) such that the first coupling member 10 is drivably engaged with the second coupling member 12. The plate 44 has a substantially cylindrical outer periphery and the opening 43 is located near the outer circumference. As viewed in the axial direction of the rotary axis 22 of the coupling plate 44 has a width corresponding with the width of the frangible element 11 and the ring 34. The blocks 38 and 39 leave a collecting space 45 for fragments of the frangible element adjacent the outer surface of the coupling plate 44. The opening 43 is bounded in the direction of the arrow A in FIG. 2, corresponding with the intended direction of operative rotation of the power take-off shaft 9, by a cutting plate 46, which is fixed by a bolt 47 in the second coupling plate 44. The tangential width of the opening 43 may be varied by using cutting plates 46 of different tangential dimensions. The tangential magnitude of the opening 43 is preferably about three times the thickness of the steel tape. The depth of the opening 43, measured in a radial direction, is about 4 to 9 mms, preferably 5 mms.

The second coupling plate 44 is journalled with the aid of a bearing 48 on the hub 13. Therefore, after fracture of the frangible element 11 the two coupling members can rotate relatively to one another. The second coupling member 12 is fixed axially with respect to the first coupling member 19 by a retaining ring or circlip 49. On the side facing the coupling plate 21 the ring 49 engages a locking ring 50, which is mounted coaxially on the hub 13. On the other side the ring 49 is surrounded by a fixing plate 53 which is secured by bolts 51 to the second coupling plate 44 and is part of a fork 52 of the universal joint 4.

The coupling illustrated in FIGS. 1 to 4 operates as follows.

Since it is arranged on the end portion of the intermediate shaft the overload coupling 8 constitutes, in operation, part of the connection between the power take-off shaft 9 of, for example, an agricultural tractor and the shaft portion 7 of, for example, an agricultural implement (not shown). The coupling 8 is not, however, restricted to such use and may be arranged anywhere between a driving shaft and a driven shaft for preventing overload.

Before the coupling 8 is put into operation, the frangible element 11 comprising the length of steel tape 36 is fitted in place. When new, the steel tape has a length of about 4 meters and it is preferably supplied to the user in a wound state, kept coiled by, for example, a string. To load the tape into the coupling 8, it is slipped onto the intermediate shaft 1, the plate 53 being, if necessary, disconnected; then the string is removed from the tape, care being taken to ensure that the preliminary bent-over end portion 37 enters the slot 41. The free end 35 engages one of the teeth on the inner side of the ring 34.

The advancing spring 24 is then wound up. This is performed by turning the housing including the outer wall 30 in a sense opposite to the direction of rotation of the intermediate shaft indicated by the arrow A in FIG. 2. The manual gripping of the housing is considerably facilitated by the milling 32 on the surface of the wall 30. The wall 30 thus turns with respect to the ring 34 and the end panel 21. The pawl springs 33 prevent the wall 30 from turning back again. After the spring 24 is fully wound, the spring, through the wall 30, exerts a fairly appreciable force through the ring 34 on the free end 35 of the tape 36. Thus the tape 36 will be further stressed so that the tip 42 of the tape exerts a force in an approximately radial direction in the slot 41 on the second coupling plate 44. By turning the coupling plate 44 with respect to the coupling plate 21, the opening or guide slot 43 comes into register with the slot 41, and the tip 42 of the tape 36 will snap into the opening 43. Thus the breaking tape 36 occupies a position in which the two coupling halves are interconnected for rotation together.

Rotation of the power take-off shaft 9 causes the top 42 of the tape 36 to be urged against the cutting edge of the cutting plate 46. In order that it makes a continuous curve with the slot 41, this cutting edge has a cutting surface at an acute angle to the associated radial line. The tape 36 shown, having a width of 4 cms, a thickness of 1 mm, and the opening 43 being spaced from the rotary axis 22 by about 7.5 cms, is capable of transmitting powers up to about 100 HP with a speed of the power take-off shaft of 540 rev/min without fracture of the frangible element 11.

In the event of overload the shearing force acting between the cutting blocks 38 and 39 and the cutting plate 46 breaks off the tip 42 of the portion located in the opening 43. Owing to the pointed form of the cutting plate 46, the sharp point of the end portion of the block 38 and the co-operation with the neighbouring obtuse point of the block 39, the cutting effect is sharply defined. After a portion of the tape 36 has broken off, the first coupling member 10 will continue rotating, whereas the second coupling member 12 will come to a standstill very soon or after some time, depending upon the nature of the overload. The pressure exerted by the advancing means comprising the spring 24, the wall 30 and the ring 34 on the tape 36 presses the new tip 12 of the tape onto the second coupling plate 44. The tangential magnitude of the opening 43, is, however, such that even at the normal operating speed of the power take-off shaft 9 the free end 42 cannot move far enough into the opening 43 for a new interconnecting position to be established. The tangential magnitude of the opening 43 is determined by formula $S=\frac{1}{2}AT^2$. It is important for the spring tension adjusted to the length of tape 36 to be displaced to be such that the force provided by the spring 24 is insufficient to urge the tip 42 into the opening 43, with a given size of the opening 43, at the normal speed of the power-take-off shaft 9. Thus the tape 36 can only be moved into a new interconnecting position after the speed has been reduced preferably to one tenth of the operating speed (for example, to 50 rev/min). In the construction shown in FIG. 2 the tangential magnitude of the opening 43 is about 3-times the thickness of the tape, that is to say, about 3 mms. This critical advancing system of the tape prevents breaking off of the tape with an undesirably rapid order of succession. In the event of overload the operator has to reduce the speed of the power take-off shaft 9 on purpose to a great extent before re-establishment of the connection between the coupling members 10 and 12 becomes possible.

The great length of the tape permits about 1000 to 1100 fractures of the breaking member, the coupling each time automatically reconnecting itself without the need for replacing parts. It is particularly important for the cutting blocks 38 and 39 and the cutting plate 46 to be made from specially hardened material in order to ensure on the one hand a sharply defined cut of the tape 36 and to avoid on the other hand damage of the cutting parts of the blocks. The broken off fragments of the tape 36 are first collected in the space 45 and eventually are discharged in an axial direction. After the spring has been wound, the advancing means formed by the spring 24, the wall 30 and the ring 34 is capable of displacing the breaking tape for a very long time, preferably by its whole length, by turning in the direction of the arrow A in FIG. 2 with respect to the first coupling member 10. It may, however, also be advantageous to adjust the spring 24 so that rewinding of the spring has to be carried out at the normal servicing intervals of the implement. This will give the user of the implement a reminder that the servicing is due. Various thickness of tape are available for the user to match the maximum torque to be transmitted. It is useful to arrange the cutting blocks 38 and 39 in such relative positions that the tangential magnitude of the slot 41 is adjustable so that the magnitude of the opening 43 can be adjusted to the thickness of the breaking tape concerned. This can alternatively be achieved by providing cutting plates 46 with different tangential magnitudes. Under some circumstances it may be advantageous to cause the spring steel tape 36 to act as an advancing member, in which case the spring 24 may be omitted; this allows a more compact structure of the coupling 8. By fastening the outer wall 30 rigidly to the rest of the first coupling member 10 and by making the ring 34, which would have to be fixed to the free end 35 of the tape, windable the coupling can be modified to this effect. If the coupling is used in a drive which runs fairly uniformly in normal operation, the advancing means of the tape 36 may comprise only an outer wall 30 co-operating with the ring 34, the wall 30 then urging the tape 36 by inertia force, when the driving source is switched on, into the opening 43.

To make it possible to keep a check of the number of fractures of the tape it may be useful to provide the coupling 8 with a counter actuated, for example, by relative displacement of the wall 30 and the rest of the coupling member 10.

The overload coupling 8 may be employed not only for protecting a rotating shaft but also in a reciprocatory system, for example, on a driving crank rod in a cutter bar or a baler. The reciprocatory movement of a first rod may be transferred to a second rod by a connection established by the tape 36.

It should be noted that the coupling is not necessarily equipped with a tape. It may alternatively be employed with slightly flexible wire. As a further alternative, a curved rigid pin may be used, which can be cut many times in succession and be pressed home by advancing means.

Figure 5:
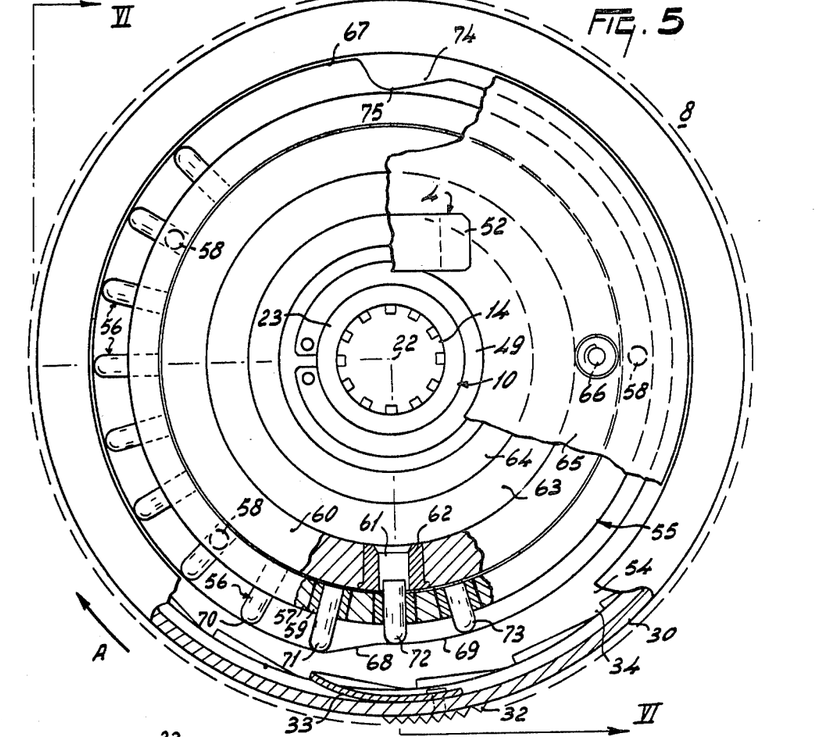
FIG. 5 is a sectional, partly elevational, view of a second embodiment of overload coupling.

The variant of the overload coupling shown in FIG. 5 comprises advancing means and further parts designed largely like those of the first embodiment. The pawl springs 33 on the inner side of the wall 30 co-operate with a ring 54, which is adapted to co-operate with a shear pin assembly 55 shown in FIGS. 5 and 6 which comprises a plurality of radially arranged frangible elements constituted by shear pins 56 arranged in a magazine 57. The magazine 57 is held in place by three irregularly distributed fitting pins 58, which are connected with the first coupling plate 21. Thus the magazine 57 can be connected with the coupling plate 21 only in one position. The pins 56 are frictionally clamped in hardened sleeves 59. These sleeves are pressed into the magazine 57. The radially inner side of the magazine 57 is adjacent a cutting ring 60 forming part of the second coupling member of the coupling.

The cutting ring 60 has a radial opening 61 for receiving a portion of the shear pin in the interconnecting position, this opening being bounded by a hardened sleeve 62. The tangential magnitude of the opening 61, as in the preceding embodiment, slightly exceeds the tangential magnitude of the shear pin 56. The radially inner side of the cutting ring 60 is partly adjacent a space 63 for collecting broken off shear pin fragments. Near the rotary axis 22 and on the side of the coupling plate 21, the space 63 is bounded by a second coupling plate 64 connected with the cutting ring 60 and being journalled, as in the first embodiment, by means of a bearing 48 on the hub 13 and being secured against an undesirable axial movement with the aid of the locking ring 50 and the ring 49. On the side of the universal coupling 3 the second coupling member is covered by a lid 65 extending from the hub 13 to the inner end of the portion 31. The lid 65 is furthermore connected with the two fork portions 52 as is the first embodiment. The cutting ring 60 and the second coupling plate 64 connected to it are connected to the lid 65 by two bolts 66 having wing heads. The bolts 66 thus provide a quick-release connection for the shear pin assembly 55. On the side facing the rotary axis 22 the ring 54 has a shape suitable for supporting the various shear pins 56. The ring has a first supporting surface 67, which lightly supports the shear pins 56 not yet moved into a first connecting position. In a direction opposite the arrow A, the first supporting surface 67 ends at a ramp portion 68 having a slanting surface which is at an angle of about 20° to 50°, preferably 30°, to the associated tangential plane. The ramp portion ends at a second supporting surface 69, which is nearer the rotary axis 22 than the first supporting surface 67. Since the shear pins 56 each have a rounded-off head 70, the pins can slide smoothly up the ramp portion 68 when the ring 54 rotates in the direction of the arrow A. As is illustrated in FIG. 5, the ramp portion 68, under the action of the spring 24, exerts pressure on a shear pin 71 which is not yet occupying a connecting position. At the same time, the shear pin 72 has been moved radially inwards and projects into the opening 61 to interconnect the two coupling members. The head of the shear pin 72 abuts the second supporting face 69 at a location near the ramp portion 68. A third shear pin 73, which has been broken once by an overload, is located between the second supporting face 69 and the interface between the magazine 57 and the cutting ring 60. The second supporting face 69 is coaxial with the rotary axis 22 and extends from the ramp portion 68 in a direction opposite the arrow A through an arc of about 170° and ends at a second ramp portion 74 having an upwardly sloping surface similar to that of the first ramp portion 68. At the top of the ramp portion 74 there is a third supporting face 75 which extends over a fairly short distance coaxially with the rotary axis 22. This supporting face has such a tangential magnitude that it can support one shear pin 56 at a time. In a direction opposite the arrow A the third supporting face 75 joins the first supporting face 67.

Figure 6:
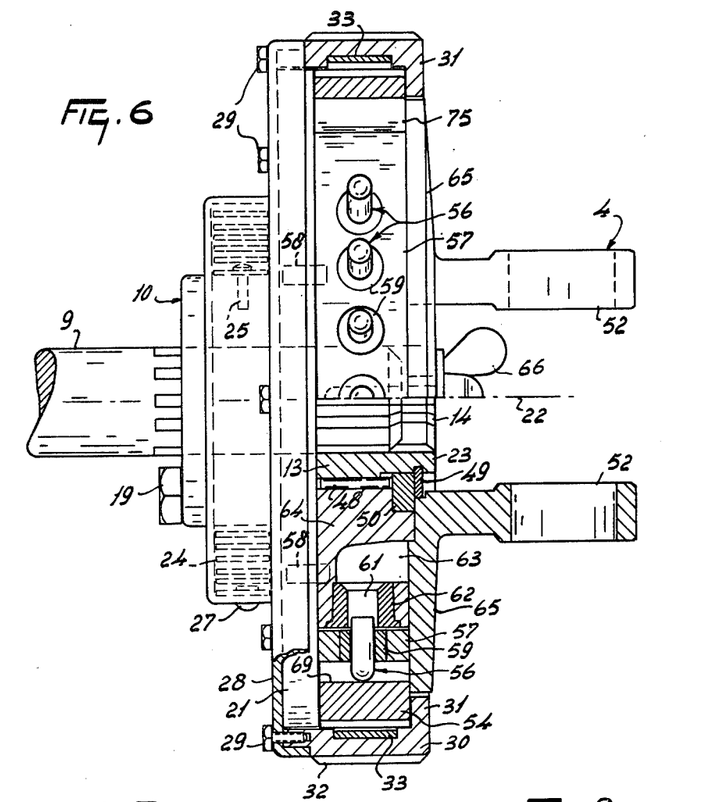
FIG. 6 is a sectional view taken on the line VI—VI in FIG. 5.

The coupling 8 shown in FIGS. 5 and 6 is made operative by loading it with a magazine 57 provided with new shear pins 56. To do this, the lid 65 is removed by undoing the wing bolts 66, after which the magazine can be simply introduced. The magazine has a series of radially extending shear pins 56 arranged over an arc of about 160°; in the embodiment described there are eleven pins. The pin designated by 73 is initially located in front of the ramp portion 68, viewed in the direction of the arrow A. In this position, all the pins are disposed between the first supporting face 67 and the interface between the magazine 57 and the cutting ring 60. After the spring 24 has been wound up, the advancing means formed by the spring 24, the wall 30 and the ring 54 causes the ramp portion 68 to exert pressure on the shear pin 73 owing to the sloping connecting surface on the ramp portion. By turning the second coupling member 12 with respect to the first coupling member 10, the pin 73 and the opening 61 become aligned, and the pin is slipped by the advancing means into the opening 61. At the same time the ring 54 turns in the direction of the arrow A until the ramp portion 68 reaches the next pin 72. The coupling is then ready for normal operation. In the event of an overload, the portion of the shear pin 73 lying in the opening 61 in the connecting position will break off, and the second coupling member will then come to a standstill. Owing to the critical tangential magnitude of the opening 61, it is not possible for the next shear pin to slip into the opening 61 while the power take-off shaft is rotating with a speed higher than or equal to the normal operating speed. This tangential magnitude is also defined by the formula $S=\frac{1}{2}AT^2$. After the operator has intentionally reduced the speed of the power take-off shaft, the ring 54 can again turn through a small angle in the direction of the arrow A and simultaneously move the shear pin 72 into a connecting position. The ring 54 then occupies the position shown in FIG. 5, the ramp portion 68 being then in engagement with the shear pin 71, which thus prevents its further rotation. Fracture of the shear pins followed by a turn of the ring 54 and the positioning of a next shear pin will continue until all the shear pins have broken off once. Then the breaking pin 73 will be in contact with the second ramp portion 74, and so the pin 73 will be slipped for a second time into the opening 61 in a radial direction, the rounded-off head of the breaking pin 73 then abutting the third supporting face 75. The second ramp portion 74 thus causes all the shear pins to operate again in the same way as before. In this manner, each shear pin 56 is used twice. If more ramp portions are provided, this cycle can be repeated several more times after the ramp portion 74. This means that an overload coupling can be made in a compact form, while it is capable of resuming its function many times after rupture for transmitting a high torque.

Figure 7:
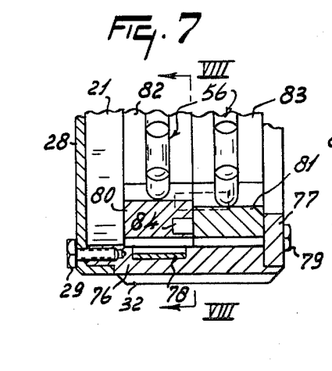
FIG. 7 shows an alternative embodiment of part of the coupling shown in FIG. 6.
Figure 8:
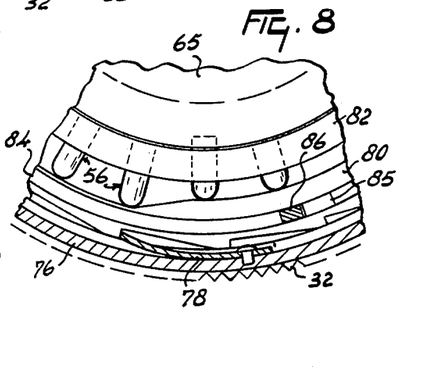
FIG. 8 is a sectional view taken on the lines VIII—VIII in FIG. 6.

FIGS. 7 and 8 show a variant of the coupling of FIG. 5; it comprises a substantially identical housing having an annular wall portion 76, which is secured by bolts 79 to an inner part 77. The wall portion 76 is provided on its inner side with fairly narrow pawl springs 78 co-operating with a ring 80. At one side of the ring 80 there is a second ring 81, which is not in contact with the wall 76. The rings 80 and 81 are substantially identical to the ring of FIG. 5. The rings 80 and 81 co-operate with magazines 82 and 83 respectively which are similar to the magazine 57 of FIG. 5, each magazine co-operating with the opening in the cutting ring 60. The first ring 80 has a groove 84 extending coaxially with the rotary axis 22 and containing a stop 85. The second ring 81 has an axially extending catch 86 projecting into the groove 84. The overload coupling shown in FIGS. 7 and 8 operates by means of the ring 80, which forms together with the wall 75 and the spring 24 an advancing means for the magazine 82 in the manner illustrated in FIG. 5. After the pins of the first magazine 82 have been used, the stop 85 engages the catch 86 to rotate the ring 81. The advancing means thus comes via the ring 80 into contact with the second ring 81 and a second series of pins fastened in the second magazine 83 is moved in succession into the connecting positions. Thus the capacity of the coupling is doubled. In a similar manner, by using a plurality or rings arranged one after the other, the capacity of the overload coupling 8 can be further raised. The magazines arranged one after the other in an axial direction may have identical shapes.

Figure 9:
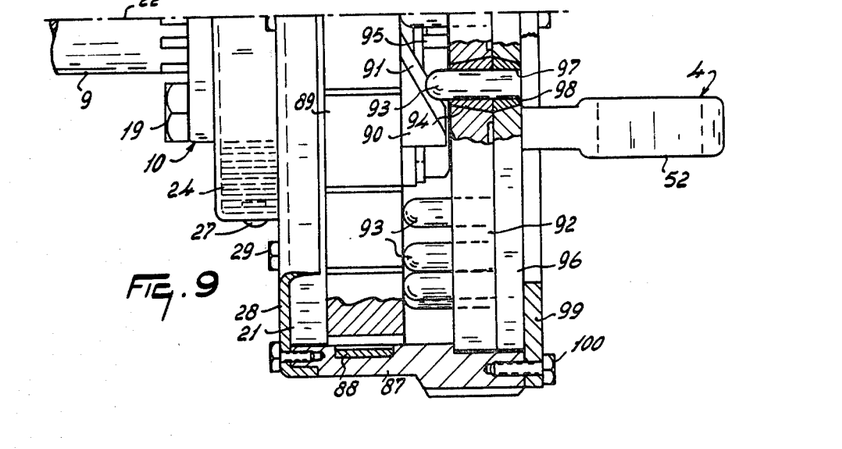
FIG. 9 illustrates a further ambodiment of overload coupling.

FIG. 9 shows an embodiment of an overload coupling substantially corresponding with the preceding embodiments as regards its outward appearance. The outer wall shown in FIG. 9 comprises a wall 87 extending from the plate 38 coaxially with the rotary axis 22 and having a slightly larger diameter on the side of the universal coupling 4 and having unevennesses on part of its circumference. The wall 87 is provided near the coupling plate 21 with a plurality of pawl springs 88, which co-operate with a ring 89, which is coaxial with the rotary axis 22 and has saw tooth projections for co-operation with the pawl springs 88. The ring 89 is provided on the side away from the coupling plate 21 with a ramp portion 90 having an upwardly inclined face 91. The face 91 is at an acute angle to a plane perpendicular to the rotary axis 22, this angle being preferably about 20° to 40°, more preferably about 30°. The ring 89 forming part of the advancing means co-operates by means of the ramp portion 90 with a magazine 92 comprising shear pins 93 arranged on a circle which is coaxial with the rotary axis 22. The magazine 92 together with the shear pins 93 constitutes a shear pin assembly. The shear pins 93 are slightly clamped in the magazine 92 in hardened sleeves 94. On the side of the rotary axis 22 the magazine 92 is provided with grooves (not shown) which fit corresponding extensions on a connecting plate 95, which is secured to the hub 13. The second coupling member 12 comprises a disc 96 extending transversely of the rotary axis 22 and having an axially extending opening 97 bounded by a hard steel sleeve 98. The pin 93 can thus occupy a connecting position in the opening 97. The plate 96 is secured in the same manner as described above with the aid of a ring to the hub 13 and near the circumference of the coupling it is surrounded by a locking ring 99, which is secured by bolts 100 to the wall 87. The plate 96 is connected with the fork parts 52 of the universal coupling 4. The overload coupling shown in FIG. 9 operates basically in the same manner as that shown in FIG. 5. The difference is that the pins 93 extend axially, while ramp portions 90 are used, which move the pins 93 one after the other into the connecting positions. The distance between two neighbouring pins should correspond to the length of the ramp portion 90. In this manner only one ramp portion on the ring 89 may be sufficient. The advantage of the structure shown in FIG. 9 is that the pins can be arranged very near the circumference of the overload coupling so that the coupling is capable of transferring a high torque. The axial disposition of the pins permits, in addition, the use of pins of a comparatively great length so that the pins can break off a great many times.

While various features of the coupling that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An overload coupling comprising two coupling members and frangible means, said frangible means, in normal operation, interconnecting said two coupling members for rotation together, rotary advancing means associated with said frangible means that advances, after fracture of said frangible means, an unfractured part of the remainder of said frangible means into an operative position in which said frangible means re-connects said two coupling members.

2. An overload coupling as claimed in claim 1, wherein as frangible means includes at least one continuous member and said advancing means cooperates with said frangible means to advance said continuous member, after fracture, into a new position in which said coupling members are again interconnected.

3. An overload coupling comprising two coupling members and frangible means which, in normal operation, interconnects said two coupling members for rotation together about a common axis, rotary advancing means associated with said frangible means and at least a portion of the latter being displaced by the advancing means, after fracture of the frangible means, said portion being urged into an operative position in which said portion re-connects said two coupling members for rotary movement in common.

4. An overload coupling as claimed in claim 3, wherein said advancing means comprises a ring that urges said frangible member to reconnect said members.

5. An overload coupling as claimed in claim 4, wherein said advancing means comprises drive means that rotates said ring in one direction.

6. An overload coupling as claimed in claim 5, wherein said ring is provided, at least one one side, with an unevennesses which cooperate with said drive means.

7. An overload coupling as claimed in claim 6, wherein said unevennesses comprises a saw-tooth profile.

8. An overload coupling as claimed in claim 7, wherein said saw-tooth profile is located on the outer periphery of said ring.

9. An overload coupling as claimed in claim 7, wherein said drive means comprises a spring.

10. An overload coupling as claimed in claim 9, wherein said spring is a spiral spring.

11. An overload coupling as claimed in claim 10, wherein said ring is freely rotatable relative to one of said coupling members.

12. An overload coupling as claimed in claim 11, wherein said spring is positioned coaxially with the axis of rotation of said advancing means.

13. An overload coupling as claimed in claim 9, wherein said spring is rigidly secured, near one of its ends, to one of said coupling members.

14. An overload coupling as claimed in claim 13 in which the other end of said spring is connected with a housing positioned coaxially with the axis of rotation of said advancing means.

15. An overload coupling as claimed in claim 14, wherein said housing is at least partly cylindrical.

16. An overload coupling as claimed in claim 15, wherein said housing mounts, on its inner side, at least one pawl spring which cooperates with the unevennesses on said ring.

17. An overload coupling as claimed in claim 16, wherein said spring is adapted to be wound up by rotating said housing.

18. An overload coupling as claimed in claim 17, wherein said housing has a rough outer periphery.

19. An overload coupling as claimed in claim 14, wherein said housing comprises an outer wall of said coupling.

20. An overload coupling as claimed in claim 9, wherein said spring is axially spaced from said ring.

21. An overload coupling as claimed in claim 3, wherein the axis of rotation of said advancing means coincides with the axis of rotation of the overload coupling.

22. An overload coupling as claimed in claim 21, wherein said drive means comprises a spring, the direction of winding of said spring being opposite to the direction of rotation of the coupling during normal operation.

23. An overload coupling as claimed in claim 3, wherein said frangible means is at least partly bent relative to the remainder thereof.

24. An overload coupling comprising two coupling members and a frangible element which, in normal operation, interconnects the coupling members for common movement, said frangible element being at least partly bent relative to the remainder thereof and the bent part of said element interconnecting said members.

25. An overload coupling as claimed in claim 24, wherein said coupling is rotary and the frangible element encircles the axis of rotation of the coupling, the radius of curvature of said element being substantially equal to the radius of curvature of a ring and said ring comprising rotatable advancing means that urges said element to connect the members.

26. An overload coupling as claimed in claim 25, wherein said frangible element is at least partly coaxial with the axis of rotation of said advancing means.

27. An overload coupling as claimed in claim 26, wherein, after fracture, at least part of said frangible element is moved by said advancing means radially with respect to the axis of rotation thereof.

28. An overload coupling as claimed in claim 26, wherein, after fracture, at least part of said frangible element is moved by said advancing means axially with respect to the axis of rotation thereof.

29. An overload copuling as claimed in claim 26, wherein said element is located substantially completely within said ring.

30. An overload coupling as claimed in claim 26, wherein said element surrounds the axis of rotation of the advancing means with a plurality of turns.

31. An overload coupling as claimed in claim 30, wherein the element has at least ten turns.

32. An overload coupling as claimed in claim 31, wherein the length of said element comprises more than a hundred portions that can be fractured and separated from the remainder thereof.

33. An overload coupling as claimed in claim 26, wherein said element comprises a thousand or more portions that can be fractured by overload.

34. An overload coupling as claimed in claim 26 wherein, during operation, said element is biased in the advancing direction of said advancing means.

35. An overload coupling as claimed in claim 26, wherein said frangible element is a spring steel tape.

36. An overload coupling as claimed in claim 24, wherein said element comprises a piece of edge material.

37. An overload coupling comprising two coupling members and frangible means, said frangible means normally interconnecting two coupling members for rotation together, said frangible means comprising a piece of edge material that is fractured upon overload.

38. An overload coupling as claimed in claim 37, wherein said frangible means comprises a wound length of steel tape.

39. An overload coupling as claimed in claim 38, wherein said tape has a width greater than five times its thickness.

40. An overload coupling as claimed in claim 39, wherein said tape has a width about sixty times its thickness.

41. An overload coupling as claimed in claim 37, wherein said coupling includes a circular housing and an inner ring, the axial width of said tape being substantially equal to the width of said ring.

42. An overload coupling as claimed in claim 41, wherein said ring has an uneven part that cooperates with said frangible means.

43. An overload coupling as claimed in claim 42, wherein, near said uneven part, said ring has a surface which extends towards the axis of rotation of advancing means and the latter urges said frangible means into engagement with a driven coupling member.

44. An overload coupling as claimed in claim 42, wherein one end of said frangible means cooperates with said uneven part and the other end of said frangible means establishes the connection between said two coupling members.

45. An overload coupling as claimed in claim 44, wherein the two end portions of said frangible means are bent over in opposite senses.

46. An overload coupling as claimed in claim 44, wherein adjacent the end remote from said ring, said frangible means is conducted along guide means mounted on one of said coupling members.

47. An overload coupling as claimed in claim 46, wherein said guide means is located near the interface of said two coupling members.

48. An overload coupling as claimed in claim 47, wherein said guide means comprises at least one cutting block of hardened material.

49. An overload coupling as claimed in claim 48, wherein said guide means comprises two cutting blocks.

50. An overload coupling as claimed in claim 49, wherein a guide slot is formed between said cutting blocks.

51. An overload safety device as claimed in claim 50, wherein the tangential magnitude of said guide slot decreases in the direction towards the second coupling member, relative to the one member on which the guide means is mounted.

52. An overload coupling as claimed in claim 48, wherein said guide means is positioned to deflect said frangible means from a substantially tangential position towards the axis of rotation of said advancing means.

53. An overload coupling as claimed in claim 48, wherein said cutting block is composed of titanium carbide.

54. An overload coupling as claimed in claim 37, wherein one of said coupling members has an opening in which the frangible means is received to interconnect said coupling members, said opening being bounded on one side by a cutting plate.

55. An overload coupling as claimed in claim 54, wherein, as viewed in a tangential direction, the size of said opening is at least twice the thickness of said frangible means.

56. An overload coupling as claimed in claim 54, wherein the size of said opening, as viewed in a tangential direction, is adjustable.

57. An overload coupling as claimed in claim 54, wherein advancing means urges the frangible means into said opening and the size of the opening, as viewed in a tangential direction, adjusts responsive to the action of said advancing means, whereby, after fracture, the advancing means is prevented from advancing said frangible means into the opening while said coupling members are rotating relative to each other at a normal operating speed.

58. An overload coupling as claimed in claim 37, wherein said frangible means comprises a plurality of shear pins mounted in a detachable magazine.

59. An overload coupling as claimed in claim 58, wherein each said shear pin is movable into at least two positions and said coupling members are interconnected in both positions.

60. An overload coupling as claimed in claim 59, wherein in which the advancing means comprising a ring is positioned adjacent at least one of said members and said ring has a side whose distance from the interface between the two coupling members decreases from a first position to a second position of each said shear pin.

61. An overload coupling as claimed in claim 60, wherein said ring has at least two supporting faces located at different distances from one of the coupling members that supports each shear pin in said first and second positions respectively.

62. An overload coupling as claimed in claim 61, wherein a ramp portion is provided between said two supporting faces.

63. An overload coupling as claimed in claim 62, wherein said ramp portion comprises means limiting the movement of said ring with respect to the rest of a coupling member in which it is accommodated.

64. An overload coupling as claimed in claim 62, wherein the distance between two neighboring shear pins is substantially equal to the interval between said two supporting faces, measured in a tangential direction.

65. An overload coupling as claimed in claim 60, wherein a further ring of said advancing means is provided in said magazine and the first mentioned ring is adapted to be coupled with said further ring.

66. An overload coupling as claimed in claim 65, wherein said further ring is positioned to move frangible pins into their respective positions.

67. An overload coupling as claimed in claim 37, wherein said frangible means is mounted on a magazine and a quick-release connection affixes said magazine in position to interconnect said two coupling members.

68. An overload coupling as claimed in claim 37, wherein one of said coupling members is connected with a fork part of a universal coupling.

69. An overload coupling as claimed in claim 68, wherein said fork part is connected with said one coupling member by bolts.

70. An overload coupling as claimed in claim 37, wherein said coupling is connected to an intermediate shaft having two universal joints.

71. An overload coupling as claimed in claim 37, wherein said two coupling members are journalled relative to one another.

72. An overload coupling as claimed in claim 37, wherein one of said coupling members has splines that receives a driving shaft.

73. An overload coupling as claimed in claim 37, wherein one of said coupling members is provided with retaining means that axially fixes a shaft in that coupling member.

74. An overload coupling as claimed in claim 73, wherein said retaining means is operated by axial movement of a part of the retaining means.

75. An overload coupling as claimed in claim 37, wherein a space between said two coupling members is located to collect fragments of said frangible means.

76. An overload coupling as claimed in claim 37, wherein at least the operative part of said frangible means is a length of steel tape.

77. A frangible element suitable for use in an overload coupling and interconnecting two coupling members for rotation together during normal operation, at least one operative frangible part of an element comprising a length of steel tape and said operative part being interposed between means that severs said part upon overload permitting relative rotation between the two members.

78. An overload coupling which comprises: a first coupling member affixed to a powered shaft; a second coupling member journalled on first coupling member and being connected to means driven thereby; frangible means providing a rigid connection between said first and second coupling members whereby the rotation of said first coupling member causes like rotation of second coupling member, spring loaded advancing means on said first coupling member, said frangible means being connected to said advancing means, receiving means for a portion of said frangible means on said second coupling member, said advancing means urging said portion into said receiving means; whereby when said frangible means in said receiving means is fractured, said advancing means urges a further unfractured portion of said frangible means into said receiving means when permitted by a lessening of the difference between the rotational speed of said first coupling member and that of said second coupling member.

79. An overload coupling which comprises: a first coupling member, a second coupling member journalled on said first coupling member; spring operated advancing means connected to said first coupling member, a ring-like magazine carrying frangible means mounted on said advancing means; a hub member included in said second coupling member, said hub member carrying receiving means adapted to receive an operative portion of said frangible means, said receiving means being located adjacent said magazine; and said advancing means resiliently urging said portion into said receiving means; the portion of said frangible means in said receiving means being fractured, said advancing means urges a further unfractured portion of said frangible means into said receiving means.

* * * * *